United States Patent [19]
Blauvelt et al.

[11] Patent Number: 5,278,688
[45] Date of Patent: Jan. 11, 1994

[54] FAULT TOLERANT FIBER OPTIC TRANSMISSION SYSTEM

[75] Inventors: Henry A. Blauvelt, San Marino; Israel Ury, Los Angeles, both of Calif.

[73] Assignee: Ortel Corporation, Alhambra, Calif.

[21] Appl. No.: 781,072

[22] Filed: Oct. 18, 1991

Related U.S. Application Data

[63] Continuation-in-part of Ser. No. 513,827, Apr. 24, 1990, abandoned.

[51] Int. Cl.$^5$ .................. H04J 14/02; H04B 10/00
[52] U.S. Cl. .................. 359/125; 359/110; 359/133; 359/173; 385/31
[58] Field of Search .......... 359/127, 133, 110, 111, 359/162, 164, 173, 124, 125, 188, 132; 385/31, 389/124

[56] References Cited

U.S. PATENT DOCUMENTS

| | | | |
|---|---|---|---|
| 4,726,644 | 2/1988 | Mathis | 370/3 |
| 4,882,775 | 11/1989 | Coleman | 455/617 |
| 4,973,169 | 11/1990 | Slonecker | 359/124 |

FOREIGN PATENT DOCUMENTS

| | | | |
|---|---|---|---|
| 0034564 | 3/1980 | Japan | 359/133 |
| 0135438 | 10/1980 | Japan | 359/124 |
| 0019544 | 9/1981 | Japan | 359/124 |
| 0190039 | 9/1985 | Japan | 359/124 |
| 0168436 | 7/1987 | Japan | 359/124 |

Primary Examiner—Richard E. Chilcot, Jr.
Assistant Examiner—Kinfe-Michael Negash
Attorney, Agent, or Firm—Christie, Parker & Hale

[57] ABSTRACT

A fault tolerant fiber optic system has a plurality of lasers modulated by the same signal source. The signals from the lasers are conveyed to an optical coupler by single mode optical fibers. The signals from all of the lasers are mixed in the optical coupler, producing an output signal which is an average of the input signals from the lasers. The optical coupler has a plurality of output single mode fibers which can transmit the averaged signal to a number of optical receivers. By optically combining the signals in phase with each other, the failure of any laser decreases signal strength, but does not disable the system. Surprisingly, the averaging also has the capability of improving the carrier to noise and carrier to distortion ratios for the system, since noise and distortion from the lasers are not correlated and are diminished by a factor of N where N is the number of lasers.

18 Claims, 1 Drawing Sheet

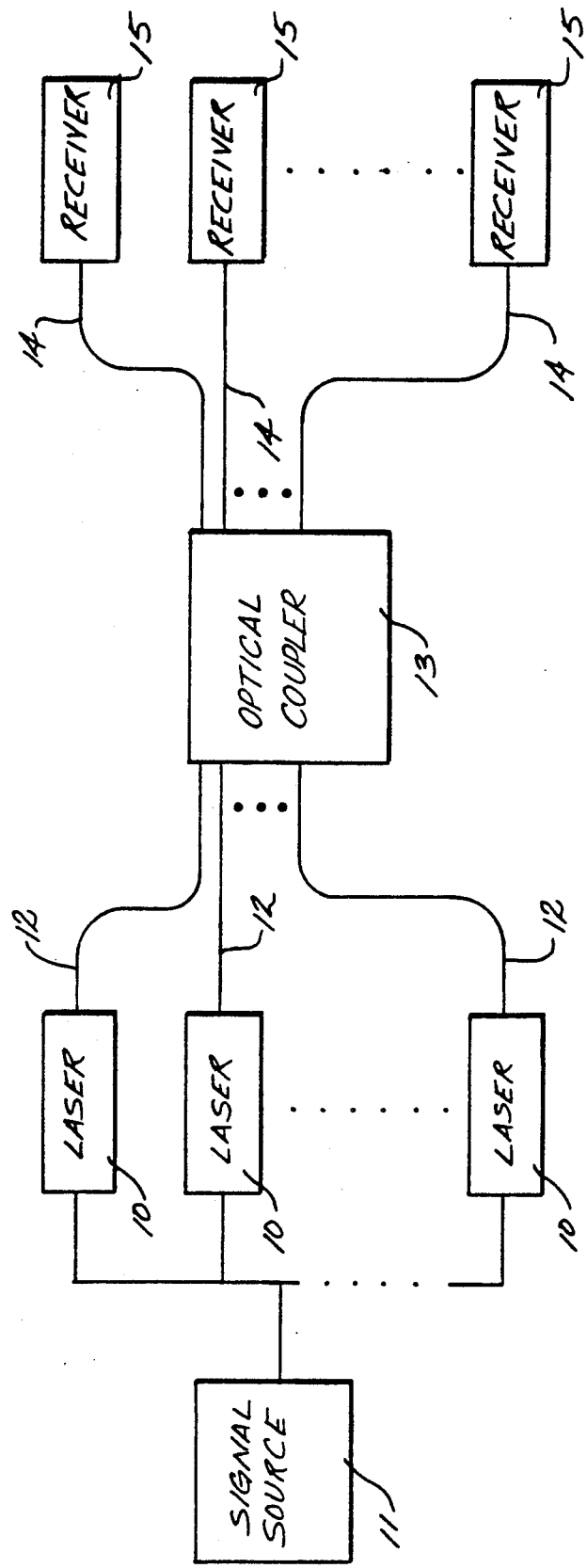

FAULT TOLERANT FIBER OPTIC TRANSMISSION SYSTEM

BACKGROUND OF THE INVENTION

This application is a continuation-in-part of U.S. patent application Ser. No. 07/513,827, filed Apr. 24, 1990, now abandoned. The subject matter of the prior application is hereby incorporated by reference.

Optical communications and data transmission have become matter of fact in today's world. Electrically modulated lasers are employed for applying signals to optical fibers which transmit such signals to receivers at remote locations. One such application of this type of technology is for cable TV where amplitude modulated signals are employed, as compared with the digital signals more commonly employed for data transmission. In such an analog system it is desirable to have a technique for minimizing noise and distortion created at the laser or light emitting diode (LED) which serves as a modulator for the optical signal.

It is also desirable in communication systems and the like to provide redundancy or other features which can accommodate for failure of a component without disabling the entire system. In other words, it is desirable that the system be tolerant of faults in its components.

In an exemplary cable TV distribution system, a semiconductor laser is electrically modulated to provide a signal to a single mode optical fiber which transmits the signal to a receiver or to an optical coupler which splits the signal amongst a plurality of single mode optical fibers for transmission to a plurality of receivers. Single mode fibers are used to avoid modal noise which arises in multimode fibers. Such noise arises from the difference in propagation time of different modes along the fiber.

In such a cable TV system, failure or degradation of the laser results in signal failure to the receiver or receivers. Redundancy may be provided in such a system by having two lasers with parallel fiber optic systems to the several receivers. This of course doubles the cost. It is desirable to provide tolerance for failure of such a laser without the cost of a parallel system.

SUMMARY OF THE INVENTION

There is therefore provided in the practice of this invention, according to a presently preferred embodiment, a fault tolerant fiber optic system having means for producing the same optical signal on each of two single mode optical fibers. The two signals are fed into an optical coupler with the signals in phase with each other for mixing of the two modulated input signals to provide at least one single mode optical fiber output for transmitting a signal combining the two modulated optical signals. In effect, each output signal is the average of the input signals to the coupler. Thus, if one of the lasers should fail, the other continues to provide an output optical signal from the system. Surprisingly, this can also reduce the contribution to system noise and distortion attributable to the laser.

BRIEF DESCRIPTION OF THE DRAWING

These and other features and advantages of the present invention will be appreciated as the same becomes better understood by reference to the following detailed description when considered in connection with the accompanying drawing which is a schematic illustration in block form of a fiber optic system constructed according to principles of this invention.

DETAILED DESCRIPTION

All of the components employed in the practice of this invention are conventional. Thus, the specific components need not be described in detail. It is the interconnection between components that produces the novel results.

The fiber optic system comprises a plurality of lasers 10, the output of which is modulated by a signal source 11 which provides an input electrical signal for controlling the output signal of the lasers. A single electrical signal source is connected to all of the lasers. A signal source may, for example, provide an output television signal for a cable TV network. Any arbitrary number N of lasers may be used, but the system may be exemplified by two lasers.

Each laser introduces a modulated light signal into a single mode optical fiber 12. These optical fibers serve as inputs to an optical coupler 13. An exemplary optical coupler is a device in which two (or more) optical fibers are brought in close proximity or fused together such that a signal in one of the fibers "leaks" into the other fiber. In a simple embodiment of such an optical coupler, it may serve as a Y-splitter where a signal is introduced by way of one input fiber to produce approximately half power output signals in each of two output fibers. Such optical couplers can be obtained with plural inputs and plural outputs. Thus, for example, a 4×4 coupler has four input fibers and four output fibers.

The output fibers 14 from the optical coupler are each connected to an optical receiver 15. The output fibers are also single mode fibers so that modal noise which would occur in a multimode fiber does not affect the signal. The number of receivers in the fiber optic system does not need to be the same as the number of modulated light sources and may be appreciably different from the number of light sources. One may, for example, add optical couplers (not shown) as splitters in the output fibers 14 so that each output fiber from the principal optical coupler 13 can provide signal to a number of receivers. Thus, for example, there may be situations where there are a plurality of single mode inputs to the optical coupler for redundancy and a single output fiber which may be split into separate signal fibers later.

As an example of such a system, an input television signal may be transmitted by single mode optical fibers to a number of receivers scattered through a neighborhood. At each receiver, the optical signal is converted back to an electrical signal which is then transmitted to a group of individual subscribers.

Thus, in a generalized system, the electronic signal from the signal source is split N ways to drive N lasers with identical signals. The N optical fibers 12 are then brought together at an N×N' coupler 13 that uniformly distributes power among the N' output fibers 14. The sum of the electrical and optical path lengths from the signal source 11 to the optical coupler 13 for each laser is adjusted so that the modulated optical signals from the N lasers arrive at the coupler substantially in phase. That is, the signals are in phase, not the optical frequencies. Signal in each input fiber is coupled into each of the output fibers. Each output from the optical coupler is approximately the average of the inputs.

In such a system, each laser is selected so that it has a slightly different wavelength from the other lasers. The wavelengths are spaced such that the difference between any two optical frequencies does not fall in the electronic signal frequency band. This prevents "beating" of the optical carriers which would interfere with the signal. For example, if the system operates at a wavelength of 1300 nm, a separation of 0.1 nm corresponds to 18 GHz, which is well outside the cable television band.

It will be noted that if one of the lasers fails, the output signal on the output fibers is concomitantly reduced, but signal is continued to the several receivers from the balance of the lasers. In a system having two lasers, for example, the output signal power is reduced 6 dB but the system continues to operate. Thus, the fault tolerant system gives one an opportunity to change a laser which has failed without switching to a redundant system or losing signal altogether.

Such a system also has the capability of improving the carrier to noise ratio and the carrier to distortion ratio. Assuming for generality that there is an N×N system, it is instructive to first analyze the system with only one laser operating. The coupler reduces the optical intensity in the output fibers from that in the input fiber by a factor of N (assuming no excess losses). The intensity I in any one of the output fibers just past the coupler can be written as:

$$I = \frac{1}{N} Re[I_{CW} + I_{sig}e^{i\omega t} + I_{noise}e^{i\omega t} + I_{dist}e^{i\omega t}]$$

This accounts for the continuous wave light level $I_{cw}$, the modulated signal level $I_{sig}$, the noise $I_{noise}$, and the distortion $I_{dist}$, in a channel centered at a signal frequency $\omega$. The symbol "Re" indicates that the "real part" of the terms is considered and the imaginary part is not considered. The electrical power measured at a receiver, such as a photodiode, is related to the time average of the square of the optical intensity:

$$Power = I^2$$

where the bar denotes time averaging.

Using the relation $Re[A] = \frac{1}{2}[A + A^*]$, where the asterisk denotes complex conjugate, and substituting, we find that:

$$Power = \frac{1}{4N^2} [I_{CW} + I_{sig}e^{i\omega t} + I_{noise}e^{i\omega t} + I_{dist}e^{i\omega t} + c.c.]^2$$

$$= \frac{1}{4N^2} [4I^2_{CW} + 2|I_{sig}|^2 + 2|I_{noise}|^2 + 2|I_{dist}|^2] +$$

$$\frac{1}{4N^2} \{I_{sig}I_{noise}^* + I_{sig}I_{dist}^* + I_{noise}I_{dist}^* + c.c.\}$$

where c.c. refers to the complex conjugate of all the terms preceding the brackets. Terms with factors of $e^{\pm i\omega t}$ are not included because they average out to zero. The terms within the curly braces are also zero because the signal, the noise introduced by the lasers, and the distortion are not correlated.

The coupler has the effect of reducing the power of the signal (as well as that of the noise and distortion) by a factor of $N^2$. The carrier to noise ratio (CNR), however, remains unchanged.

$$CNR = \frac{\frac{1}{2N^2} |I_{sig}|^2}{\frac{1}{2N^2} |I_{noise}|^2} = \frac{|I_{sig}|^2}{|I_{noise}|^2}$$

The carrier to distortion ratio also remains unchanged by the same relation.

Next, considering when all of the N lasers are operating, in any of the output fibers we find the intensity:

$$I = \frac{1}{N} \sum_{j=1}^{N} Re[I_{CW} + I_{sig}e^{i\omega t} + I_{noise}^{(j)}e^{i\omega t} + I_{dist}^{(j)}e^{i\omega t}]$$

where the continuous wave and signal intensities are assumed to be equal among the lasers. Electrical power is the time average of the square of the optical intensity or:

Power =

$$\frac{1}{4N^2} \left[ \sum_{j=1}^{N} (I_{CW} + I_{sig}e^{i\omega t} + I_{noise}^{(j)}e^{i\omega t} + I_{dist}^{(j)}e^{i\omega t} + c.c.)^2 \right]$$

The cross terms involving $e^{\pm i\omega t}$ average to zero. Most of the other cross terms essentially vanish in time averaging because the terms (e.g. signal and noise) are not correlated. A possible exception comes from the distortion terms which may be partially correlated if the distortion behavior of the several lasers is somewhat similar from one to another. The result is:

$$Power = I^2_{CW} + \frac{1}{2} |I_{sig}|^2 + \frac{1}{2N^2} \sum_{j=1}^{N} |I_{noise}^{(j)}|^2 +$$

$$\frac{1}{2N^2} \sum_{j=1}^{N} |I_{dist}^{(j)}|^2 + \frac{1}{2N^2} \sum_{j \neq k} I_{dist}^{(j)} I_{dist}^{(k)*}$$

If we neglect the possibility of the distortions of the lasers being correlated, then the last term also vanishes. Assuming for comparison that the noise and distortion contributions are equal from all of the lasers:

$$Power = I^2 + \frac{1}{2} |I_{sig}|^2 + \frac{1}{2N} |I_{noise}|^2 + \frac{1}{2N} |I_{dist}|^2$$

From this we see the surprising result that the carrier to noise ratio (CNR) is improved by a factor of N:

$$CNR = \frac{\frac{1}{2} |I_{sig}|^2}{\frac{1}{2N} |I_{noise}|^2} = N \frac{|I_{sig}|^2}{|I_{noise}|^2}$$

The same improvement holds true for distortion.

Assuming, for example, that the system has just two lasers (N=2), where each of the lasers has about the same noise and distortion levels, the noise and distortion of the described system is improved by 3 dB over what can be obtained from just one of the lasers. Alternatively, consider that the noise and distortion of one of the lasers increases by a factor of three (4.8 dB), then the noise and distortion of the system will be identical to what could be obtained from the better laser acting alone. As mentioned above, if one of the lasers fails altogether, the noise and distortion characteristics of the system will be determined by the surviving laser (or lasers), but the signal power is reduced by a factor of four (6 dB).

It will be noted that the noise reduction of the system is not necessarily the same as the noise reduction just mentioned since there may be other sources of noise or distortion at or downstream from the coupler, and the system does not remove noise from the input electronic signal since it remains correlated. In particular, light from one laser can heterodyne with the spontaneous emission from another laser to create excess noise. In principle, this can be eliminated by filtering the light from each laser before it enters the coupler.

As mentioned above, the signal path length from the electronic signal source to the optical coupler for each of the lasers should be substantially the same so that the modulated signal is in phase at the several inputs to the optical coupler. It is desirable to assemble apparatus such that the electrical signal paths from the signal source to the several lasers is equal. One can then easily provide a laser module with an output optical fiber which has a standard path length for time delay which can be "plugged in" to the optical coupler. Then, if a laser fails, such a module can be substituted in the system without degrading performance. The delay is easily adjusted by controlling the fiber length.

Alternatively, one may assemble a system and make delay adjustments in the signal path between the electronic signal source and the optical modulators so that the signals arrive in phase with each other at the optical coupler. This may be easier than adjusting optical path length.

A single embodiment of fault tolerant and noise and distortion improved fiber optic system has been described and illustrated schematically herein, however, it will be understood that many modifications and variations of such a system may be readily implemented. Thus, for example, although the system has been exemplified with semiconductor lasers as modulated light sources, light emitting diodes or the like may also be used. Also, instead of modulating the light generating lasers, the light beam may be modulated externally from the laser before going to the optical coupler. Such a system may also be used with lasers followed by optical amplifiers as the modulated light sources. This is advantageous since the optical amplifiers may also introduce noise and distortion which is ameliorated in practice of this invention. Many other modifications and variations will be apparent to those skilled in the art, and it is therefore to be understood that the scope of this invention is limited only by the following claims.

What is claimed is:

1. A fault tolerant fiberoptic system comprising:
   first means for producing a first optical signal on a first signal mode optical fiber;
   second means for producing a second optical signal on a second single mode optical fiber;
   input means coupled to the first and second means for modulating the first and second means for producing first and second optical signals with the same amplitude modulated signal;
   coupler means connected to the fibers for mixing the first and second optical signals;
   a plurality of single mode optical fiber outputs from the coupler means for transmitting an optical signal on each of the optical fiber outputs which is an average of the first and second optical signals.

2. A fiberoptic system as recited in claim 1 wherein the means for producing optical signals each comprise a semiconductor laser.

3. A fiberoptic system as recited in claim 1 wherein the means for producing optical signals each comprise a laser and wherein the wavelength of each laser is sufficiently different from the wavelength of each other laser that the frequency difference between the lasers does not lie within the bandwidth of the signal.

4. A fault tolerant fiberoptic system comprising:
   a first modulated input light source having a first optical fiber output for transmitting a single mode optical signal;
   a second modulated input light source having a second optical fiber output for transmitting a single mode optical signal;
   input means for modulating both of the light sources with the same signal;
   an optical coupler having as parallel inputs the first and second optical fibers, the signal paths from the means for modulating through the light sources to the optical coupler having similar phase delays so that the modulated signals from the two light sources are in phase with each other at the input to the optical coupler; and
   at least one single mode output optical fiber from the optical coupler, each such output fiber having single mode signals which is an average of the signals from the first and second optical fibers.

5. A fiberoptic system as recited in claim 4 wherein the light sources each comprise a semiconductor laser.

6. A fiberoptic system as recited in claim 4 wherein the light sources each comprise a laser and wherein the wavelength of each laser is sufficiently different from the wavelength of each other laser that the frequency difference between the lasers does not lie within the bandwidth of the signal.

7. A fiberoptic system as recited in claim 4 comprising a plurality of single mode output optical fibers.

8. A fault tolerant fiberoptic system comprising:
   a first light source having a first modulated single mode optical signal output;
   a second light source having a second single mode optical modulated signal output;
   input means for modulating both of the light sources with the same signal;
   an optical coupler;
   a first single mode optical fiber connecting the first light source to a first input to the optical coupler;
   a second single mode optical fiber connecting the second light source to a second input to the optical coupler, the first and second optical fibers each having a length such that the second optical signal is in phase with the first optical signal; and
   a plurality of output single mode optical fibers connected to the optical coupler for transmitting signals combined from the first and second optical fibers.

9. A fiberoptic system as recited in claim 8 wherein the light sources each comprise a semiconductor laser.

10. A fiberoptic system as recited in claim 8 wherein the light sources each comprise a laser and wherein the wavelength of each laser is sufficiently different from the wavelength of each other laser that the frequency difference between the lasers does not lie within the bandwidth of the signal.

11. A fault tolerant fiberoptic system comprising:
    a plurality of light sources;

means for modulating all of the light sources with the same signal;
an optical coupler;
a single mode input optical fiber connected between the output of each of the light sources and an input of the optical coupler, each of the input optical fibers having a length such that the optical signals in all of the fibers are in phase with each other at the input to the optical coupler; and
a plurality of single mode output optical fibers connected to outputs of the optical coupler for transmitting signals which is an average of the signals from the plurality of input optical fibers.

12. A fiberoptic system as recited in claim 11 wherein the light sources each comprise a semiconductor laser.

13. A fiberoptic system as recited in claim 11 wherein the light sources each comprise a laser and wherein the wavelength of each laser is sufficiently different from the wavelength of each other laser that the frequency difference between the lasers does not lie within the bandwidth of the signal.

14. A method for minimizing modulator noise and distortion in a fiberoptic system comprising the steps of:
introducing a first modulated optical signal into a first single mode optical fiber;
introducing a second modulated optical signal into a second single mode optical fiber, the modulation of the second optical signal being the same as the first optical signal;
optically combining the first and second modulated signals with the two modulations being in phase with each other; and
extracting a plurality of modulated single mode optical signals, each of the extracted signals being an average of of the first and second modulated signals.

15. A method as recited in claim 14 wherein each optical fiber has a length sufficient for delivering the signals in phase.

16. A method as recited in claim 14 wherein the difference in frequency between the light sources does not lie within the bandwidth of the signal.

17. A method for minimizing modulator noise and distortion in a fiberoptic system comprising the steps of:
producing the same modulated optical signal on each of at least two single mode optical fibers;
feeding the modulated signals into an optical coupler in phase with each other for mixing of the two modulated signals; and
transmitting a signal from the coupler on each of a plurality of single mode optical fibers, the signal on each of the fibers from the coupler being an average of the two modulated signals.

18. A method as recited in claim 17 wherein each optical signal is produced by a laser modulated by a single signal source and comprising the step of adjusting the optical signal path length so that the signals are in phase with each other.

* * * * *

UNITED STATES PATENT AND TRADEMARK OFFICE
CERTIFICATE OF CORRECTION

PATENT NO. : 5,278,688
DATED : January 11, 1994
INVENTOR(S) : Henry A. Blauvelt; Israel Ury It is certified that error appears in the above-indentified patent and that said Letters Patent is hereby corrected as shown below:

Column 3, delete the equation in line 43 and insert therefor $$Power = \overline{I^2}$$

Column 3, delete the equation in lines 50-56 and insert therefor $$Power = \frac{1}{4N^2} [\overline{I_{cw} + I_{sig}e^{iwt} + I_{noise}e^{iwt} I_{dist}e^{iwt} + c.c.}]^2$$

$$= \frac{1}{4N^2} [4 I_{cw}^2 + 2|\overline{I_{sig}}|^2 + 2|\overline{I_{noise}}|^2 + 2|\overline{I_{dist}}|^2] +$$

$$\frac{1}{4N^2} [\overline{I_{sig}I_{noise}^*} + \overline{I_{sig}I_{dist}^*} + \overline{I_{noise}I_{dist}^*} + c.c.]$$

UNITED STATES PATENT AND TRADEMARK OFFICE
CERTIFICATE OF CORRECTION

PATENT NO. : 5,278,688
DATED : January 11, 1994
INVENTOR(S) : Henry A. Blauvelt; Israel Ury It is certified that error appears in the above-indentified patent and that said Letters Patent is hereby corrected as shown below:

Column 4, delete the equation in lines 2-5 and insert therefor $$CNR = \frac{\frac{1}{2N^2}|\overline{I_{sig}}|^2}{\frac{1}{2N^2}|\overline{I_{noise}}|^2} = \frac{|\overline{I_{sig}}|^2}{|\overline{I_{noise}}|^2}$$

Column 4, delete the equation in lines 20-24 and insert therefor $$Power = \frac{1}{4N^2}\left[\sum_{j=1}^{N}(I_{CW} + I_{sig}e^{iwt} + I_{noise}^{(j)}e^{iwt} + I_{dist}^{(j)}e^{iwt} + c.c.)^2\right]$$

Column 4, delete the equation in lines 35-38 and insert therefor $$Power = I_{CW}^2 + \frac{1}{2}|I_{sig}|^2 + \frac{1}{2N^2}\sum_{(j=1)}^{N}|I_{noise}^2$$

$$+ \frac{1}{2N^2}\sum_{j=1}^{N}|I_{dist}^{(j)}|^2 + \frac{1}{2N^2}\sum_{j \neq k}\overline{I_{dist}^{(j)}I_{dist}^{(k)*}}$$

UNITED STATES PATENT AND TRADEMARK OFFICE
CERTIFICATE OF CORRECTION

PATENT NO. : 5,278,688
DATED : January 11, 1994
INVENTOR(S) : Henry A. Blauvelt; Israel Ury It is certified that error appears in the above-indentified patent and that said Letters Patent is hereby corrected as shown below:

Column 4, delete the equation in line 46 and insert therefor $$Power = I^2 + \frac{1}{2}|\overline{I_{sig}}|^2 + \frac{1}{2N}|\overline{I_{noise}}|^2 + \frac{1}{2N}|\overline{I_{dist}}|^2$$

Column 4, delete lines 52-54 and insert therefor $$CNR = \frac{\frac{1}{2}|\overline{I_{sig}}|^2}{\frac{1}{2N}|\overline{I_{noise}}|^2} = N\frac{|\overline{I_{sig}}|^2}{|\overline{I_{noise}}|^2}$$

Column 5, line 55, after "first" change "signal" to -- single --.

Signed and Sealed this

Thirteenth Day of September, 1994

Attest:

BRUCE LEHMAN

*Attesting Officer*    *Commissioner of Patents and Trademarks*